Figure 1:
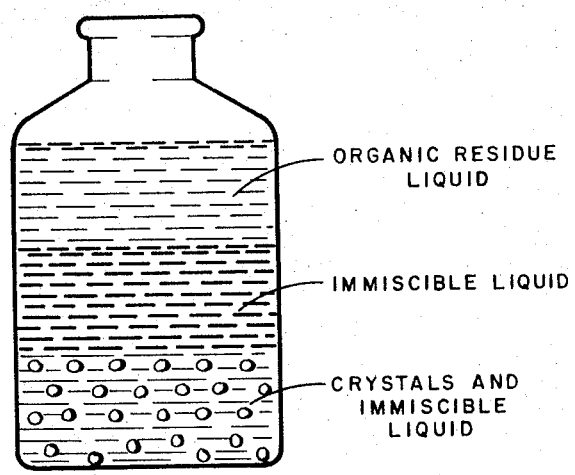

United States Patent [19]

Wylie

[11] 3,758,601

[45] Sept. 11, 1973

[54] THREE-PHASE ORGANICS SEPARATION PROCESS

[76] Inventor: Roger Wylie, Baytown, Tex.

[22] Filed: Nov. 17, 1971

[21] Appl. No.: 199,459

[52] U.S. Cl............................................. 260/674 A
[51] Int. Cl.............................................. C07c 7/14
[58] Field of Search................................. 260/674 A

[56] References Cited
UNITED STATES PATENTS

| | | | |
|---|---|---|---|
| 2,921,969 | 1/1960 | Loy..................................... | 260/674 |
| 3,643,453 | 2/1972 | Groothuis et al.................... | 260/674 |
| 3,541,804 | 11/1970 | Wiegandt et al.................... | 260/674 |
| 3,544,646 | 12/1970 | Broughton et al................... | 260/674 |

FOREIGN PATENTS OR APPLICATIONS

| | | | |
|---|---|---|---|
| 40/24178 | 10/1965 | Japan................................... | 260/674 |
| 1,165,299 | 9/1969 | Great Britain....................... | 260/674 |

Primary Examiner—Delbert E. Gantz
Assistant Examiner—C. E. Spresser
Attorney—Thomas B. McCulloch et al.

[57] ABSTRACT

Closely boiling hydrocarbon mixtures in which one of the components forms a solid phase, e.g. crystals, preferably xylene and/or ethylbenzene mixtures, are separated by providing a three-phase zone. One of the phases comprises the crystals of desired product. Another phase is organic material from which the crystals have separated; and the third phase is an immiscible phase.

The material constituting the immiscible phase is chosen so that it is lighter than the crystals but heavier than the remaining organic component. Moreover, it must be able to withstand crystallization itself at the subzero temperatures utilized to form the organic crystals.

Specifically, paraxylene is separated from a mixture of xylene isomers utilizing water plus methyl alcohol or water plus methyl alcohol plus glycol as the immiscible phase.

9 Claims, 2 Drawing Figures

Patented Sept. 11, 1973 3,758,601

THREE-PHASE ORGANICS SEPARATION PROCESS

BACKGROUND OF THE INVENTION

Crystallization is an often-used process in chemicals synthesis because it can separate close-boiling mixtures and reduce damage to high-boiling or heat-sensitive materials. And since it can obtain a pure compound in a single stage, crystallization is widely used as a purification step.

Compared with distillation, crystallization also has many other advantages, such as low energy requirements and low-temperature operation. Despite such advantages, however, crystallization is not nearly so widely used as distillation, because of the problems of handling the solid crystals and of separating the mother liquor from the crystals.

After a crystal is removed from the final magma, it is pure, but there is always some mother liquor that adheres to its surface. This mother liquor carries impurities into the final product.

In practice, the crystal slurry is usually centrifuged or filtered after crystallization. The moisture content, or retained mother liquor, i.e. occluded within the interstices after centrifugation, normally amounts to 20–40 percent of the weight of the crystals, depending on crystalline size and shape, mother-liquor viscosity and density, etc. Large, uniform and more perfect crystals from a low viscosity liquor retain a minimum amount of such moisture.

It is common practice to wash the crystals with fresh solvent during centrifugation or filtration, to replace the impurity-containing mother liquor. However, solvent washing requires large volumes of fresh solvent and results in poor recovery of the product — and subsequent purification of the solvent becomes expensive. (Solvent recrystallization is a common practice in the production of expensive chemicals.) The net result is a disappointing process efficiency for crystallization.

A particular problem with separating close-boiling organic mixtures is that involved with separating xylene isomers especially paraxylene from narrow-boiling hydrocarbon fractions having a high xylene concentration. Xylenes are obtained commercially from various natural sources such as coal oil distillates, as well as from other sources, such as hydrocarbon-cracking and hydroforming operations.

Thus, a xylene fraction so obtained will ordinarily contain all three xylene isomers as well as ethylbenzene. It is known that a reasonably effective separation of orthoxylene from this mixture can be made by fractionation of the xylene mixture. However, meta and paraxylenes are so close in boiling points that fractionation is ineffective to bring about separation.

Low temperature separation by crystallization of paraxylene is complicated by the formation of eutectic mixtures which result in mixed product and consequently low yields of the desired pure product.

Many techniques have been proposed. Techniques that utilize an immiscible liquid include those described in U.S. Pat. No. 2,724,007; U.S. Pat. No. 2,769,852; an article appearing on page 87 of the Chemical Engineering dated July 12, 1971 by Yun-Chung Sun entitled "Water: Key to New Crystallization Process for Purifying Organics" is also relevant.

DETAILED DISCLOSURE OF THE INVENTION

It has been discovered and forms the substance of this invention that a three-phase technique can be used to effect efficient and economical separations from mixtures of close-boiling organic materials, especially xylenes and ethylbenzene.

The three phases are: a crystal phase of the material which it is desired to recover in the pure form, an immiscible stage, and a residual organic material stage, i.e, mother liquor or magma.

The immiscible liquid is a key material; its selection and the manner in which it is utilized are most essential to achieving the particular advantages of the invention.

By immiscible liquid it is meant a liquid having the following characteristics:

a. it must not dissolve in or be dissolved by either the material forming the crystalline phase or the material forming the organic residual phase;

b. it must wet the crystals of the crystalline phase;

c. it must have a density (or specific gravity) intermediate the density of the crystals and the density of the remaining organic phase such that it is lighter than the crystal phase and heavier than the organic residue phase, i.e. in a three-phase system the immiscible material must form the middle phase; and d. it must remain essentially fluid at the temperatures needed for forming the organic crystals.

Although there is a technical difference in definition, the terms "specific gravity" and "density" are used herein interchangeably.

Suitable immiscible liquids include aqueous-based compositions such as methyl alcohol-water mixtures, ammonia-water mixtures, glycols-water mixtures, tertiary systems including alcohol-glycol-water mixtures, alcohol-ammonia-water mixtures and the like. Usually the nonaqueous component of the immiscible liquid is a freezing point depressing agent, (deicing compound), i.e. an antifreeze agent such as glycol, alcohol, $NH_3$. The key point is that the mixture must satisfy the criteria described above.

Generally speaking, $C_1$ to $C_4$ monohydroxy alcohol-water mixtures are used. Methyl alcohol is preferred and will comprise about 63 to 20, preferably 63 to 40 and most preferably 63 to 50 weight percent. No more than about 63 weight percent methanol can be used since the density (specific gravity) of that mixture would be less than that of the organic residue, i.e. mother liquor.

It is apparent, however, that higher methanol concentrations would be directionally desirable because of the higher antifreeze benefits realized from the greater quantity of methyl alcohol.

Therefore it is a feature of this invention that higher methanol quantities can be used than 63 weight percent if accompanied by small percents of glycol, particularly ethylene glycol and propylene glycol, in amounts from about .1 to 15 weight percent, preferably 0.1 to 5, and most preferably 0.1 to 3 weight percent. Therefore the density decrease caused by higher methanol contents can be offset by the use of other suitable relatively high molecular weight deicing compounds.

It is also of importance to note that the specific gravity can also be controlled either separately or simultaneously with the specific gravity of the immiscible phase by changing the gravity of the residue hydrocarbon phase, e.g. the liquid xylene phase. This would be accomplished by the addition of hydrocarbons such as pentene or ethylene. This could be especially suitable where ethylene is also being used as an autorefrigerant in the process.

Where separations based on phase differences are to be carried out, it is always possible that decantation can be accomplished. Nevertheless, it is contemplated that when plant scale operations utilizing the basic principles of the three-phase operation are carried out, it is generally necessary that separation be rapidly effected through centrifugal forces which will utilize commercial centrifuges.

It is of great importance that the invention is uniquely adaptable for certain types of centrifuges and has no real advantage for others.

Very generally centrifuges can be classified into those in which the solid portion is concentrated at one end of the centrifuge and associated with a liquid phase. The other type are those in which the solid phase is concentrated in a porous container so that liquid is not held or associated therewith.

An example of the type of centrifuge which simply dries the solids by driving the liquid through the solid phase is a basket centrifuge. Since in a basket centrifuge all the liquid phase is driven through the solid phase, then no particular advantage for the three-phase system is realized except the possible incidental benefit of causing some of the immiscible solvent to displace the organic liquid phase.

Nevertheless, such displacement does not result in the very pure paraxylene crystals that are obtained by utilizing the process of the invention in a suitable centrifuge.

Examples of suitable centrifuges are called disc-type centrifuges and bowl-type centrifuges. Other centrifuges which do not present any advantages for the process of the present invention are the screen-type centrifuges and pusher centrifuges.

Thus, disc centrifuges and bowl centrifuges are the centrifuges which are to be used if the unique, novel and outstanding advantages of the invention are to be utilized and realized.

Centrifuges are well known apparatus which are commercially available and need not be described in detail here. They are available, for example, from the Sharples Company and the Mercoe Company, a couple of well-known manufacturers. Furthermore, when a disc or solid-bowl centrifuge is to be utilized, the immiscible liquid with the specified critical density or specific gravity serves as a liquid seal between the liquid organic residue, i.e. the mother liquor and the crystals, so that when the crystals are removed they have only been in association with immiscible liquid and not with mother liquor.

In order to do this, of course, immiscible liquids must be heavier than the residue but lighter than the crystals.

It is to be noted that in the Tegge U.S. Pat. No. 2,724,007 process the inventor teaches that his immiscible liquid should be lighter than the xylene liquid. This is in exact contrast to the particular invention of Applicant. In the Paulson U.S. Pat. No. 2,769,852 patent it is not stated whether the methanol-water liquid should be heavier or lighter than the xylene liquid.

But it is clear that Paulson does not attribute any significance to the differences and it is also clear that the only possible mixtures which would be applicable to Applicant's process would be that at the lower end of the scale, i.e. the 10:6 ratio of methanol to water.

Clearly, the rest of the scale would be inapplicable.

Furthermore, Paulson centrifuges his crystals in a basket centrifuge and therefore clearly does not appreciate the unique advantages of Applicant's three-phase invention. The advantages of the three-phase operation is not obtained in a basket centrifuge. Tegge in U.S. Pat. No. 2,724,007 also completely misses the significance of the density or specific gravity. He teaches that the immiscible liquids are composed of from 50 to 95 parts of methanol and says that it is desirable that the hydrocarbon phase be the lower phase in the settler, and that can be accomplished by using a composition having at least 80 percent methanol.

Of course, this completely misses the entire point of Applicant's highly critical specific gravity in which exactly the opposite effect is required. When the hydrocarbon phase is the lower phase, it is in contact with the crystals and therefore the crystals do not realize the benefit of contact with the immiscible liquid which is to displace the hydrocarbon portion.

It is important to appreciate that in the prior art processes even when the crystals have been thoroughly centrifuged and appear to be free of liquid, that a liquid is still filling the interstices of the crystalline cake. If that liquid is residue xylene liquid, then the crystals will not be obtained in a very pure form.

If that residue is immiscible liquid as per this invention and thus substantially no liquid xylene is present, then when the crystal cake is removed containing the immiscible liquid, it can be melted and the resulting melt will contain substantially very, very high purity liquid paraxylene, for example, and the remainder will be immiscible liquid. Since it is immiscible, a decantation separation can be easily effected. The crystals, being free of liquid xylene, form quite pure separated paraxylene.

If the crystals were not free of the entrained or entrapped solvent, then that solvent xylene would be mixed with the liquid paraxylene and contamination would result, necessitating considerable additional purification stages at substantially significant capital investments. In order that the phase separation can be visually appreciated, FIG. 1 is provided in which it is seen that the crystals which are the heaviest in density are at the bottom, the immiscible liquid is intermediate in specific gravity and is in the middle, and the organic residue liquid, e.g. the xylene residue, is on the top since it is the lightest.

It can be readily appreciated that the liquid surrounding the crystals and in the interstices of any resulting crystal cake is immiscible liquid since it has simply displaced any organic residue liquid that might be present, since that organic liquid is floating on the top.

That being the case, the crystals are now surrounded by immiscible liquid. Even within the cake, the interstices are taken up with immiscible liquid and therefore, as explained in detail above, separations can be effected quite cleanly in the absence of contaminating organic liquid residue.

It can also be appreciated that in a pusher or basket-type centrifuge when all the liquid in the system is driven through the crystal cake, then very little advantage is derived from centrifugation in these particular pieces of apparatus.

On the other hand, when the centrifuge operates as does the bowl or disc type, then it can be seen that the immiscible liquid has time to surround and sometimes form a seal around the crystal phase, thus keeping out the organic liquid phase. Then when the crystals are separated, they have had contact just prior to separation with only immiscible liquid and not with liquid residue. This obviously leads to recovery of paraxylene crystals with relatively little contamination by residue liquid.

The invention is further illustrated by the following examples:

EXAMPLE 1

Figure 2:
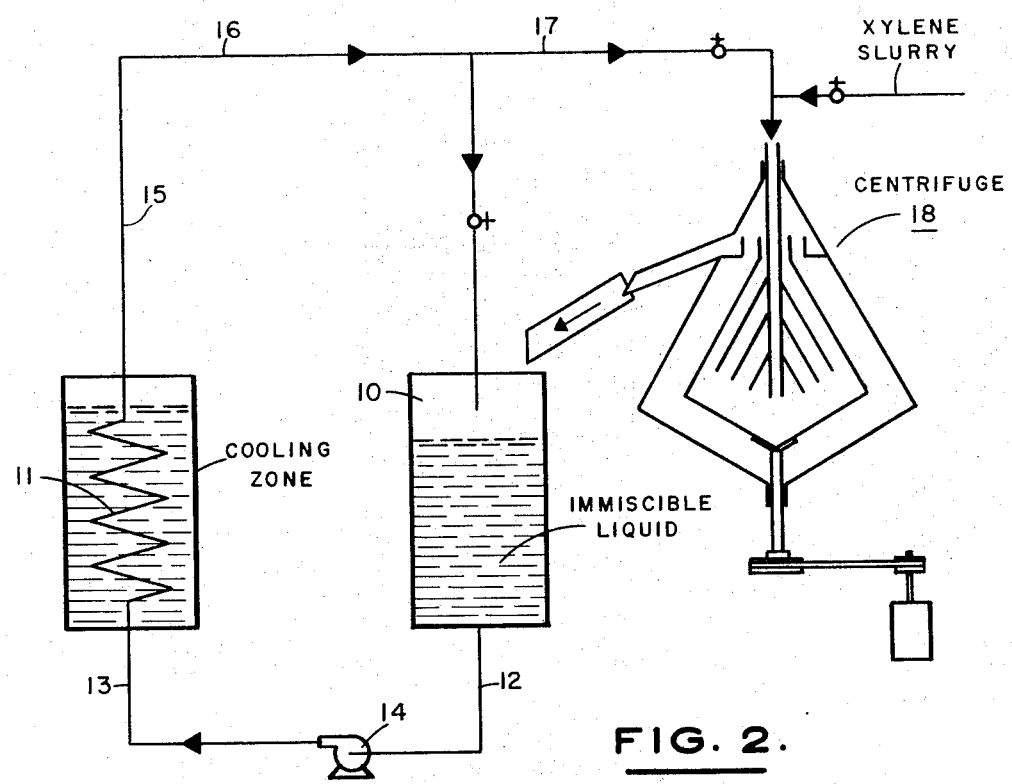

This example is to be taken in conjunction with FIG. 2 which represents the bench scale pilot unit utilized. In the example, the immiscible liquid from storage tank 10 was pumped around through cooling coil 11 through lines 12 and 13 through pump 14 and thence out of cooling coil 11 through lines 15, 16 and 17 into disc centrifuge 18. When centrifuge 18 had achieved the proper temperature, i.e. from about −70° to −80°F., xylene slurry containing about 10 weight percent of paraxylene crystals at −70° to −80°F. was blended with the immiscible liquid in line 17 and introduced into disc centrifuge 18. After centrifugation was complete the centrifuge was then purged with some additional immiscible liquid to wash out traces of any organic liquid.

The centrifuge unit which was a 6-inch DeLaval disc centrifuge was disassembled to obtain the combination of the immiscible liquid and paraxylene crystals. The contents removed from the DeLaval centrifuge were then heated in order to melt the paraxylene crystals. The hydrocarbon fraction thus obtained by decanting was subsequently analyzed for its paraxylene content.

Three runs utilizing different types of immiscible liquid were carried out. The immiscible liquid blends and the particular purity obtained are summarized in Table I which follows.

The results are compared with conventional results in a unit which used a Merco disc centrifuge.

TABLE I

DATA FROM DELAVAL DISC CENTRIFUGE

|  | Merco Disc Centrifuges | 6" DeLaval Disc Centrifuge | | |
|---|---|---|---|---|
| Immiscible Liquid, wt% |  |  |  |  |
| Methanol | None | 62.4 | 49.0 | 42.2 |
| Propylene Glycol |  |  | 33.5 |  |
| Water |  | 37.6 | 17.5 | 57.8 |
|  |  | 100.0 | 100.0 | 100.0 |
| Density Difference, gms/ml |  |  |  |  |
| Immiscible Liquid — Xylene |  | 0.007 | 0.025 | 0.027 |
| Cake Purity Wt% Paraxylene in Hydrocarbon Fraction | 30–35 | 66.6 | 91.2 & 76.0 | 89.6, 90.1, 84.5, 74.5 |

As can be seen from the above Table I, there was a small but significant density difference between the immiscible liquid and the xylene. As this density difference increased, the weight percent of paraxylene in the cake seemed to also increase. In any event, purities as high as 91.2 weight percent were obtained as compared to conventional purities of 30–35 weight percent.

Thus, it is clear that use of the technique of the invention imparts orders of magnitude improvements in paraxylene impurity in the first separation step. Thus the necessity for many subsequent recentrifuging steps, which are now necessary in conventional type processes, is eliminated. Great advantages in reducing the capital equipment outlay in utilizing the principles of this invention are clearly apparent.

EXAMPLE 2

About 50 ml of a 40 vol. % paraxylene and 60 vol. % metaxylene solution in equal parts were added to two 100 ml weathering tubes which already contained 25 ml of a 50 volume percent methanol-water solution.

The two tubes were then cooled to −40°F. to form crystals and centrifuged in a laboratory centrifuge. The system separated into a three-phase system with the crystals in a cake on the bottom. The xylene residue which was above the methanol-water layer was withdrawn.

Then the remaining alcohol-water layers containing paraxylene crystals were heated. When the crystals had melted, samples of the xylene-containing layers were analyzed. These data are summarized in Table II which follows.

TABLE II

| Purity of Crystals | Wt. % |
|---|---|
| Sample 1 | 95.3 |
| Sample 2 | 94.6 |
| Average | 95.0 |

As can be seen from the above table, the crystals had an average purity of about 95 percent which is quite high. Meta-paraxylene mixtures were chosen because metaxylene represents the most difficult xylene isomer to separate from paraxylene.

Intensive cooling in order to form crystals can be accomplished for the novel process described above, as well as for conventional crystal separation processes by a novel autorefrigeration process.

In such autorefrigeration a refrigerant gas inert to the mixture to be separated is dissolved in the mixture as the mixture is cooled, at either ambient or elevated pressures.

Suitable gases include $CO_2$, conventional gaseous refrigerants, $C_3$–$C_6$ paraffins and olefins, $SO_2$, Freons and the like.

The crystallization point is lowered by the inclusion of such gas. Subsequently to form crystals the gases would be gradually flashed off preferably from a series of crystallization zones. But it could be accomplished in a single zone.

The advantages of such gradual pressure reductions are two-fold.

First, the energy required for the compression of recycle autorefrigeration gas is lowered.

Secondly, the crystals obtained are large which is very desirable from a handling and processing standpoint. Crystals produced from a sudden shock chilling such as would occur if the flashing were permitted to take place suddenly would be small. This is particularly undesirable because it increases filter rates.

The autorefrigeration process described above is particularly compatible with the immiscible liquid invention, but is is not limited in its application to this one particular crystallization process.

What is claimed is:

1. A process for separating paraxylene from other xylene species which comprises in combination the steps of:

a. forming crystals consisting essentially of paraxylene in said other species by reducing the temperature of said species;
b. simultaneously forming a mother liquor comprising said xylene species without said crystals;
c. surrounding said crystals with a liquid immisicible with said crystals and said mother liquor to displace substantially all of said mother liquor from said crystals, wherein said immiscible liquid has a density greater than said mother liquor and less than that of said crystals and wherein said immiscible liquid is a blend of a) $H_2O$, b) more than 63 weight percent of a $C_1$ to $C_4$ monohydroxy alcohol and c) 0.1 to 15 weight percent of a $C_2$ to $C_6$ polyol;
d. floating said mother liquor on said immiscible liquid, said immiscible liquid forming a barrier between said crystals and said mother liquor to form a three-phase system of mother liquor, immiscible liquid and crystals;
e. separating from said three-phase system said crystals in association with essentially only immiscible liquid.

2. A process according to claim 1 wherein said crystals are concentrated by centrifugal force and whereby mother liquor is not forced through said concentrated crystals.

3. A process according to claim 2 wherein said centrifugal force is applied within a disc-type centrifuge.

4. A process according to claim 2 wherein said centrifugal force is applied in a solid-bowl type centrifuge.

5. A method according to claim 1 wherein said alcohol is methyl alcohol.

6. A method according to claim 1 wherein said polyol is ethylene glycol.

7. A process according to claim 1 wherein said polyol is propylene glycol.

8. A process according to claim 1 wherein the density of the mother liquor is controlled by the addition of pentene.

9. A process according to claim 1 wherein the density of the mother liquor is controlled by the addition of ethylene.

* * * * *